June 7, 1955 V. A. BURROWS 2,710,138
METER COIN BANK
Filed Jan. 7, 1953
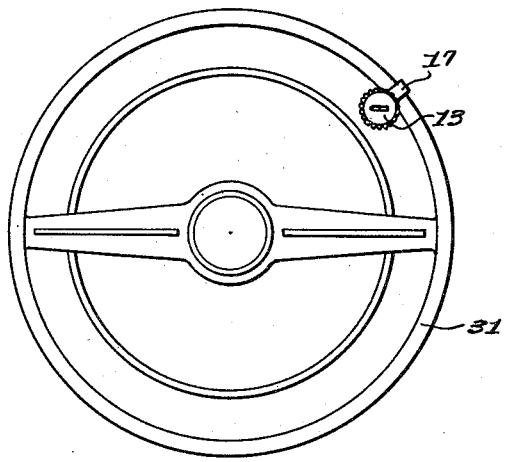
Fig. 1.
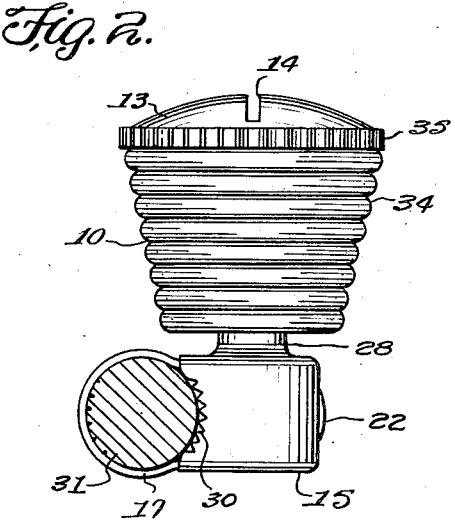
Fig. 2.
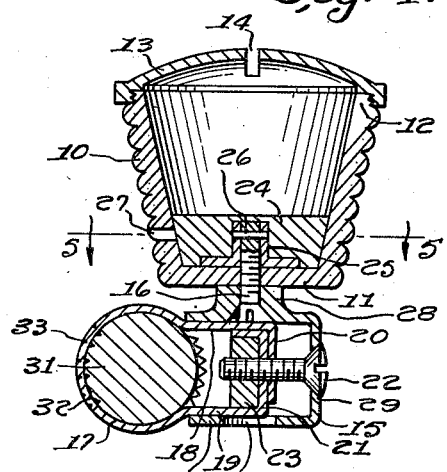
Fig. 4.
Fig. 5.
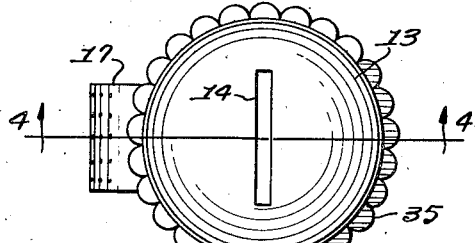
Fig. 3.
INVENTOR.
Virgil A. Burrows,
BY Victor J. Evans & Co.
ATTORNEYS

United States Patent Office 2,710,138
Patented June 7, 1955

2,710,138
METER COIN BANK

Virgil A. Burrows, Riverside, Calif.

Application January 7, 1953, Serial No. 330,111

2 Claims. (Cl. 232—6)

This invention relates to coin holders of the type used in motor vehicles for retaining coins adapted to be used in parking meters, and in particular a hollow knob having a removable cover with a coin slot therein and adapted to be mounted on the steering wheel of a motor vehicle in place of conventional knobs used on steering wheels of vehicles.

The purpose of this invention is to provide a parking meter coin bank or holder that holds coins in a readily accessible position.

Change and coin holders of various types and designs have been provided for motor vehicles, however, such devices are objectionable as it is necessary to make connections to part of the instrument panel or other parts of the vehicle and, particularly in a new vehicle of the pleasure type the instrument board is ornamental and to attach devices of any type thereto interferes with the pleasing appearance thereof. With this thought in mind this invention contemplates a parking meter coin holder that is readily clamped on the rim of a steering wheel of a motor vehicle and that is adapted to be used in place of conventional knobs used on some vehicles.

The object of this invention is, therefore, to provide means for mounting a cup-shaped coin holder on a steering wheel of a motor vehicle whereby coins may readily be inserted in and removed from the device.

Another object of the invention is to provide a parking meter coin holder for motor vehicles that is adapted to be clamped in position on the rim of a steering wheel of a vehicle without changing the design or construction of the wheel.

A further object of the invention is to provide a parking meter coin holder for motor vehicles in which the holder is of a simple and economical construction.

With these and other objects and advantages in view the invention embodies a substantially cup-shaped casing, a cover having a coin slot therein threaded on the casing, a U-shaped base secured by a screw to the lower end of the casing, and a clamp adapted to be positioned around the rim of a steering wheel, secured by a screw in the U-shaped base.

Other features and advantages of the invention will appear from the following description taken in connection with the drawing, wherein:

Figure 1 is a plan view of a motor vehicle steering wheel showing the improved parking meter coin holder thereon.

Figure 2 is a side elevational view of the improved coin holder with the parts shown on an enlarged scale and with the rim of a steering wheel upon which the device is mounted shown in section.

Figure 3 is a plan view of the parking meter coin holder with the parts as shown in Fig. 2.

Figure 4 is a vertical section through the holder taken on line 4—4 of Fig. 3.

Figure 5 is a section plan through the holder taken on line 5—5 of Fig. 4.

Referring now to the drawing wherein like reference characters denote corresponding parts the improved parking meter coin holder of this invention includes a cup-shaped casing 10 having a base 11 and having a threaded collar 12 at the upper end, a cover 13 having a slot 14 therein and threaded on the collar 12, a U-shaped base 15 secured to the base 11 of the casing with a screw 16 and a clamp 17 having arms 18 and 19 with flanges 20 and 21, respectively on the ends thereof and the arms of the clamp are secured to the base 15 with a screw 22 which extends through the flanges 20 and 21 and that is threaded into a nut 23 positioned between the arms.

The lower arm 5 of the base 15 is provided with an opening 6 through which the screw 16 is inserted.

The casing 10 is provided with a plastic frusto-conical shaped filler member 24 and the screw 16 is threaded into a flanged bushing 25 positioned in a recess in the bottom of the member 24. The screw 16 is retained in the bushing with a pin 26 and one side of the casing 10 is provided with an opening 27 to facilitate inserting the pin. After the pin is in place the filling member 24, which is preferably a hard plastic is installed in the base of the casing to provide a smooth bottom surface therefor.

The base 15 is provided with a hub 28 in which the head of the screw 16 is countersunk and the base is also provided with a countersunk opening 29 which is positioned to receive the head of the screw 22. The side walls of the base 15 are provided with teeth, as indicated by the numeral 30 which are positioned to bite into the surface of the rim 31 of a steering wheel to support the device in an upright position. Similar teeth 32 are provided in the opposite side of the clamp 17 which may be formed by indentations 33 impressed in the outer surface of the circular portion of the clamp.

In the design shown the outer surface of the casing 10 is provided with arcuate annular beads or ridges 34, however, it will be understood that the casing may be formed of other suitable designs. The rim of the cover 13 is also provided with scallops, as indicated by the numeral 35 to facilitate turning the cover when it is desired to remove coins from the holder.

It will be understood that modifications, within the scope of the appended claims, may be made in the design and arrangement of the parts without departing from the spirit of the invention.

What is claimed is:

1. In a coin holder, a cup shaped casing having a threaded collar on the upper end, a cover having a coin slot therein threaded on the collar of the casing, a hollow base having an opening in one side and a hub on the upper end upon which the casing is positioned, a flanged bushing in said casing, a screw extended through the hub of the base into said bushing for securing the casing to the base, said bushing and said screw having openings therein which are to be alined with each other to permit a pin to be inserted therein to prevent separation of said bushing and screw, said casing having an opening therein to permit the insertion of said pin and a frusto-conical filler member having a recess in the bottom thereof to receive the flanged bushing therein positioned in said casing to provide a smooth bottom surface therefor.

2. In a coin holder as in claim 1 wherein supporting means for said holder is attached to said base.

References Cited in the file of this patent

UNITED STATES PATENTS

| | | |
|---|---|---|
| 956,393 | Mechling | Apr. 26, 1910 |
| 958,648 | Jones | May 17, 1910 |
| 961,571 | Adams | June 14, 1910 |
| 1,135,595 | Livingston | Apr. 13, 1915 |
| 1,258,707 | Rice | Mar. 12, 1918 |
| 1,292,187 | Wheaton | Jan. 21, 1919 |
| 2,010,877 | Morell | Aug. 13, 1935 |
| 2,101,519 | Thorp | Dec. 7, 1937 |
| 2,212,635 | Deer | Aug. 27, 1940 |
| 2,567,901 | Wood | Sept. 11, 1951 |